G. W. LEADING.
Stove-Pipe Damper.

No. 162,757.  Patented May 4, 1875.

WITNESSES.

INVENTOR.

UNITED STATES PATENT OFFICE.

GEORGE W. LEADING, OF LACON, ASSIGNOR TO FRANK STURGES & CO., OF CHICAGO, ILLINOIS.

IMPROVEMENT IN STOVE-PIPE DAMPERS.

Specification forming part of Letters Patent No. 162,757, dated May 4, 1875; application filed April 5, 1875.

*To all whom it may concern:*

Be it known that I, GEORGE W. LEADING, of Lacon, in the county of Marshall and State of Illinois, have invented a new, useful, and Improved Stove-Pipe Damper, of which the following is a full, clear, and exact description, which will enable others skilled in the art to which my invention appertains to make and use the same, reference being had to the accompanying drawing, forming a part hereof, and in which—

Figure 1:
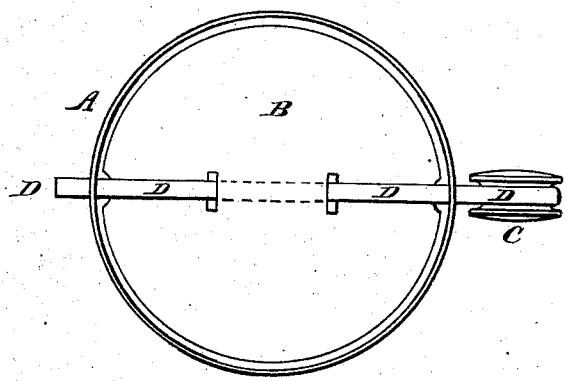
Figure 2:
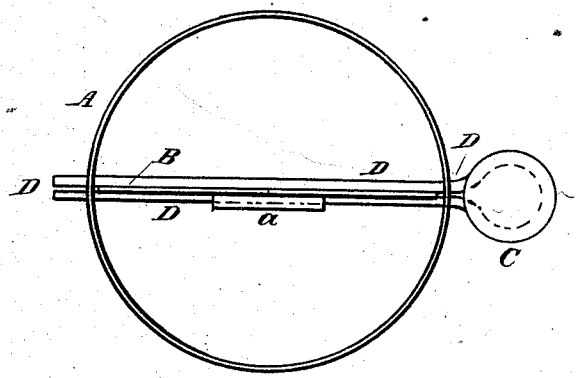

Figure 1 is a top view of a stove-pipe damper embodying my invention, the damper being closed, and Fig. 2 a like view of the same when open.

Like letters of reference indicate like parts.

In the drawing, A represents a stove-pipe. B is the diaphragm. The diaphragm is cut or looped, as shown at $a$. C is a button or thumb-piece. D is a bent wire, preferably, but not necessarily, half round. This wire is bent around the piece C, as shown, and is then passed through the small holes in which the spindles of the diaphragms of dampers of this class usually rest. One arm of this wire, in passing across the pipe, lies along one side of the diaphragm, and the other arm passes through the loop $a$ and along the other side of the diaphragm, as is clearly shown in Fig. 2. The wire D should have spring force or reflex action sufficient to create enough friction at its points of contact with the pipe to retain the diaphragm, with certainty, in any position in which it may be arranged.

I am aware that one of the spindles of the diaphragms of dampers of this class has heretofore been made yielding, for the purpose of producing this friction, and that independent springs have been inserted between the diaphragm and the pipe, for a similar purpose, examples of such construction being shown in the patent to Edwin C. Chapman, No. 144,192, November 4, 1873, and that to James M. Horton, No. 152,492, June 30, 1874, respectively; but I do not here claim such.

Having thus described my invention, what I claim as new, and desire to secure by Letters Patent, is—

A stove-pipe damper, consisting of a diaphragm, combined with the removable bent or doubled wire or spring D, passing entirely through the pipe, clasping the diaphragm, and constituting yielding spindles therefor at opposite points, whereby the diaphragm may be turned and firmly held in any position, substantially as shown and described.

GEORGE. W. LEADING.

Witnesses:
E. R. MCKINNEY,
ED. ROGERS.